(12) United States Patent
Imanishi et al.

(10) Patent No.: US 8,514,282 B2
(45) Date of Patent: Aug. 20, 2013

(54) VEHICLE PERIPHERY DISPLAY DEVICE AND METHOD FOR VEHICLE PERIPHERY IMAGE

(75) Inventors: Masayuki Imanishi, Okazaki (JP); Nobuhiko Wakayama, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 674 days.

(21) Appl. No.: 12/661,439

(22) Filed: Mar. 17, 2010

(65) Prior Publication Data

US 2010/0245574 A1 Sep. 30, 2010

(30) Foreign Application Priority Data

Mar. 25, 2009 (JP) .................................. 2009-075035

(51) Int. Cl.
*H04N 7/18* (2006.01)

(52) U.S. Cl.
USPC ........................................ 348/148; 348/143

(58) Field of Classification Search
USPC .................... 348/148, 149, 113, 114
See application file for complete search history.

(56) References Cited

U.S. PATENT DOCUMENTS

| | | | |
|---|---|---|---|
| 6,985,171 B1* | 1/2006 | Kuriya et al. ................. 348/148 |
| 7,069,128 B2* | 6/2006 | Iwama ............................ 701/36 |
| 7,859,565 B2* | 12/2010 | Schofield et al. ............. 348/148 |
| 8,120,652 B2* | 2/2012 | Bechtel et al. ................. 348/113 |
| 2003/0063773 A1 | 4/2003 | Muramatsu et al. |
| 2004/0042638 A1* | 3/2004 | Iwano .......................... 382/104 |
| 2005/0146607 A1* | 7/2005 | Linn et al. .................... 348/148 |
| 2007/0088474 A1 | 4/2007 | Sugiura et al. |
| 2007/0236364 A1* | 10/2007 | Hubbard et al. ............ 340/932.2 |
| 2007/0273554 A1* | 11/2007 | Sakakibara ................. 340/932.2 |
| 2008/0129539 A1 | 6/2008 | Kumon |
| 2008/0266396 A1* | 10/2008 | Stein ............................. 348/148 |
| 2011/0018999 A1* | 1/2011 | Joly et al. ..................... 348/148 |

(Continued)

FOREIGN PATENT DOCUMENTS

| | | |
|---|---|---|
| CN | 101055176 | 10/2007 |
| JP | 7-302346 | 11/1995 |

(Continued)

OTHER PUBLICATIONS

Office action dated Sep. 6, 2011 in corresponding Japanese Application No. 2009-75035.

(Continued)

*Primary Examiner* — Allen Wong
(74) *Attorney, Agent, or Firm* — Harness, Dickey & Pierce, PLC

(57) ABSTRACT

An imaging unit photographs an image of a periphery of the vehicle. An object detection unit obtains image information related to a brightness or a color of the image and position information on the obtained image from the image and detects object from the image information according to a specific feature of the image. A storing unit prestores a vehicle image and history data, which include the image information associated with the position information. A graphic unit overlaps the vehicle image and an image produced according to the history data and converts the overlapped image to be viewed from a predetermined viewpoint. A peripheral image display region indicates a present periphery of the vehicle. A history display region is adjacent to the peripheral image display region for indicating the converted image and the detected object at a position according to the position information.

19 Claims, 5 Drawing Sheets

(56) References Cited

U.S. PATENT DOCUMENTS

| | | | |
|---|---|---|---|
| 2011/0074955 A1* | 3/2011 | Kuehnle | 348/148 |
| 2011/0205365 A1* | 8/2011 | Kurosu et al. | 348/148 |
| 2012/0154592 A1* | 6/2012 | Mizuta | 348/148 |

FOREIGN PATENT DOCUMENTS

| | | |
|---|---|---|
| JP | 9-72716 | 3/1997 |
| JP | 11-219435 | 8/1999 |
| JP | 2002-120675 | 4/2002 |
| JP | 2003-115986 | 4/2003 |
| JP | 2003-189291 | 7/2003 |
| JP | 2003-308534 | 10/2003 |
| JP | 2006-7498 | 1/2006 |
| JP | 2006-321394 | 11/2006 |
| JP | 2006-327498 | 12/2006 |
| JP | 2007-62649 | 3/2007 |
| JP | 2007-116377 | 5/2007 |
| JP | 2007-126028 | 5/2007 |
| JP | 2007-241606 | 9/2007 |

OTHER PUBLICATIONS

Office action dated Sep. 21, 2011 in corresponding Chinese Application No. 20101014943.8.

U.S. Appl. No. 12/658,559, filed Feb. 11, 2010, Imanishi et al.

* cited by examiner

VEHICLE PERIPHERY DISPLAY DEVICE AND METHOD FOR VEHICLE PERIPHERY IMAGE

CROSS REFERENCE TO RELATED APPLICATIONS

This application is based on and incorporates herein by reference Japanese Patent Application No. 2009-75035 filed on Mar. 25, 2009.

FIELD OF THE INVENTION

The present invention relates to a vehicle periphery display device for indicating a peripheral condition of a vehicle. The present invention further relates to a method for indicating a vehicle periphery image.

BACKGROUND OF THE INVENTION

Conventionally, for example, JP-A-2003-189291 and JP-A-2006-7498 disclose an art for indicating a composite view by combining an image, which is obtained by imaging a peripheral condition of a rear side of a self-vehicle in real time, with both an image indicating a view, which is moved to the outside of a view area while the self-vehicle moves rearward, and an image of the self-vehicle. Thus, a physical relationship between the self-vehicle and the peripheral condition are provided to a driver.

According to the first conventional art described in JP-A-2003-189291, images obtained by using a camera is, for example, converted into data in coordinates of the ground surface projected in a viewpoint of a camera so as to successively produce image data of birds-eye view images. Accordingly, the indicated image is not a distorted image specific to a raw image. Subsequently, a first birds-eye view image, which is obtained in the previous imaging, is moved correspondingly to a movement of the vehicle so as to produce image data of the birds-eye view image after the movement of the vehicle. The image data of the birds-eye view image after the movement of the vehicle is combined with image data of a second birds-eye view image, which is newer than the first birds-eye view image, so as to produce a composite birds-eye view image. Further, the composite birds-eye view image is converted to a projection image, which looks like being obtained by a camera, and the projection image is indicated on a monitor device or the like.

According to the second conventional art disclosed in JP-A-2006-7498, a graphic processing unit corrects distortional aberration in present image data and previous image data caused by a wide-angle lens so as to obtain an image without distortion. Further, the graphic processing unit extracts only a part of the corrected previous image data on the vehicle side so as to obtain previous data for a composite image. Further, a viewpoint of the previous data for a composite image is converted to a viewpoint from an imaginary viewpoint on the upper side of a center of a rear wheel axle. Further, the graphic processing unit extracts only a part of the corrected present image data on a side farther from the vehicle so as to obtain present data for a composite image. Further, the graphic processing unit performs reduction conversion to reduce the present data for a composite image at a predetermined reduction ratio so as to produce reduced data. Subsequently, the graphic processing unit produces a composite image by combining the reduced data with a composite region of the previous data for a composite image, which is converted in the viewpoint, and outputs the produced composite image on a screen of a display device. Further, the graphic processing unit converts extension lines of the lateral sides of the vehicle and lines drawn by rear wheels according to the imaginary viewpoint and outputs the converted lines on the screen of the display.

In each of the conventional arts, various image processings such as the correction of distortion, the conversion of the viewpoint, and the reduction conversion of the obtained image are performed. Accordingly, processing load for the image processings becomes large.

SUMMARY OF THE INVENTION

In view of the foregoing and other problems, it is an object of the present invention to produce a vehicle periphery display device capable of facilitating indication of an object such as a white line around a vehicle outside of a view area. It is another object of the present invention to produce a method for indicating a vehicle periphery image.

According to one aspect of the present invention, a vehicle periphery display device for indicating an image of a periphery of a vehicle, the vehicle periphery display device comprises an imaging unit configured to photograph an image of a periphery of the vehicle. The vehicle periphery display device further comprises a first object detection unit configured to obtain image information related to at least one of a brightness and a color of the photographed image from the photographed image, obtain position information on the photographed image from the photographed image, detect an object including at least one of a road indication and an on-road object from the obtained image information according to a specific feature of the object in the photographed image, and associate the image information on the object with the position information on the object. The vehicle periphery display device further comprises a storing unit configured to beforehand store an vehicle image of the vehicle and store history data of the associated image information and the position information. The vehicle periphery display device further comprises a graphic unit configured to generate an image according to the history data, overlap the generated image and an image including the beforehand stored vehicle image, and convert the overlapped image to be viewed from a predetermined viewpoint. The vehicle periphery display device further comprises a display screen including a peripheral image display region configured to indicate the present image of the periphery of the vehicle obtained by the imaging unit and a history display region adjacent to the peripheral image display region and configured to indicate the converted image and the object detected from the image information in the converted image at a position according to the associated position information.

According to another aspect of the present invention, a method for indicating an image of a periphery of a vehicle, the method comprises photographing a present image of a periphery of the vehicle. The method further comprises obtaining image information related to at least one of a brightness and a color of the photographed image from the photographed image. The method further comprises obtaining position information on the photographed image from the photographed image. The method further comprises detecting an object including at least one of a road indication and an on-road object from the obtained image information according to a specific feature of the object in the photographed image. The method further comprises associating the obtained image information on the object with the obtained position information on the object. The method further comprises storing history data of the associated image information and the associated position information. The method further comprises generating an image according to the history data. The method further comprises overlapping the generated image and a beforehand stored vehicle image of the vehicle. The method further comprises converting the overlapped image to be viewed from a predetermined viewpoint. The method further comprises indicating the present image of the periphery of the vehicle in a peripheral image display region. The method further comprises indicating the converted image in a history display region adjacent to the peripheral image display region. The method further comprises indicating the detected object in the converted image at a position according to the associated position information.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (Embodiment)

The vehicle periphery display device is capable of indicating a condition around a vehicle and assisting a driving operation of a driver by providing an indication on a screen. A vehicle rear display device, which is one example of the vehicle periphery display device, will be described with reference to FIGS. 1 to 9. The vehicle rear display device indicates a composite image including a present actual image on a rear side of the vehicle, an image of the vehicle, and a periphery of the vehicle generated according to a previous image to be continuous with the actual image. Thus, the vehicle rear display device is capable of notifying a driver of an accurate position of the self-vehicle and efficiently assisting rearward parking of the vehicle.

Figure 1:
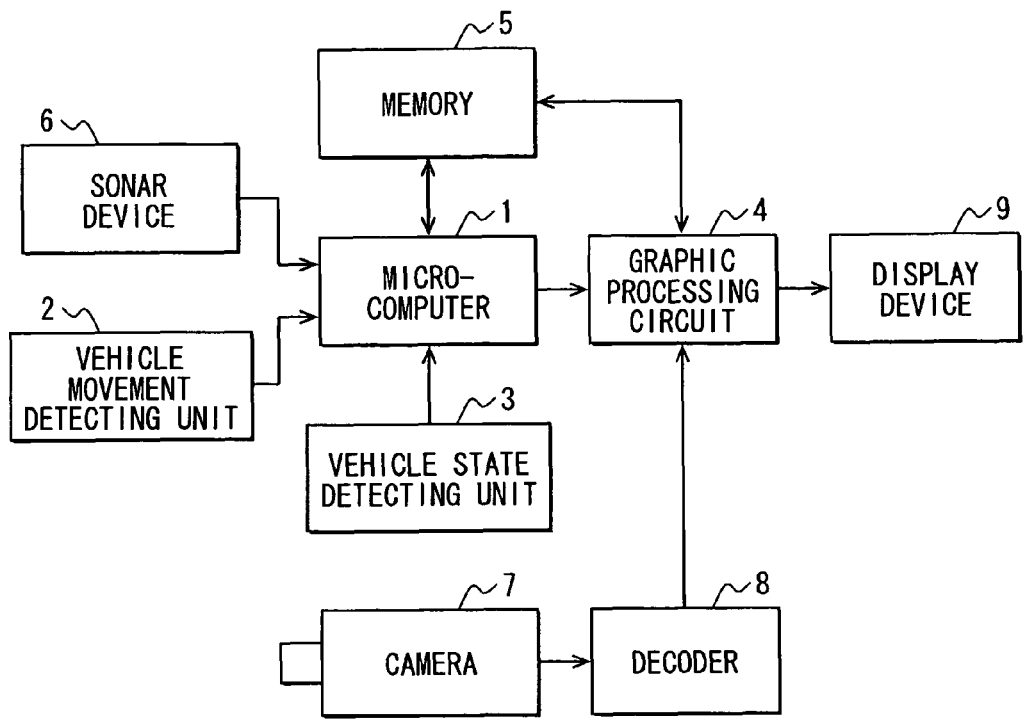
FIG. 1 is a block chart showing a vehicle back display device according to a first embodiment.
Figure 2:
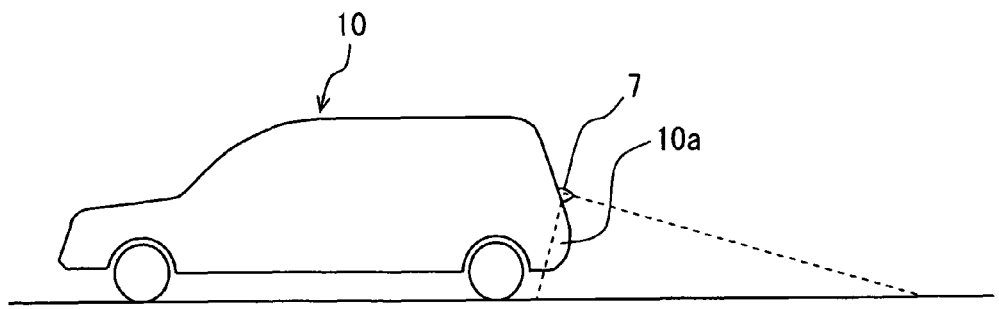
FIG. 2 is a schematic view showing a physical relationship between a vehicle and a camera.

FIG. 1 is a block diagram showing a structure of the vehicle rear display device. FIG. 2 is a schematic view showing a physical relationship between a vehicle 10 and a camera 7. The vehicle rear display device includes the camera 7, a display device 9, a graphic processing circuit (graphic unit) 4, a decoder 8, a memory 5, a microcomputer 1, and a vehicle movement detecting unit 2. The camera 7 obtains (photographs) an image of a rear side of the vehicle. The display device 9 indicates the image obtained (photographed) by using the camera 7. The graphic processing circuit 4 produces an image to be indicated on the display device 9. The decoder 8 converts an analog signal transmitted from the camera 7 into a digital signal and transmits the converted digital signal as an image signal to the graphic processing circuit 4. The memory 5 stores image information on the image obtained by using the camera 7. The microcomputer 1 controls indication of an image on the display device 9.

As shown in FIG. 2, the camera 7 is located on the upper side of a rear bumper 10a of the vehicle 10. The camera 7 has a predetermined visual field range in a predetermined angular range such as 180 degrees and a predetermined distance range on the rear side of the vehicle. The camera 7 functions as an imaging unit for obtaining a rear image throughout a wide angle range.

The memory 5 functions as a storing unit including a random access memory (RAM) for storing the picture signal as image data transmitted from the decoder 8. The memory 5 stores image information on a previous image, which is obtained by using the camera 7 and associated with position information on the image, as history data. In addition, the memory 5 prestores a rear image of the vehicle 10. The rear image of the vehicle 10 is generated to have an accurate physical relationship relative to the obtained image. The rear image of the vehicle 10 prestored in the memory 5 includes the rear bumper 10a of the vehicle 10 and the like. In the following embodiment, a computer graphic image (vehicle computer graphic, vehicle CG) when viewed from a predetermined viewpoint at a predetermined position on the upper side (high side) of the vehicle is beforehand produced and employed as one example of the rear image. The memory 5 communicates with each of the microcomputer 1 and the graphic processing circuit 4.

The microcomputer 1 functions as an object detection unit for detecting at least one of a road indication and an object (on-road object) on a road, which is located around the vehicle and demanded to be detected for assisting a driving operation, from the image. The on-road object is, for example, another vehicle, a wall, and a pedestrian detected by using an ultrasonic sonar or the like. The road indication is an obstacle, a parking frame, a guidance line on a road, and the like located in a space, into which the vehicle 10 is going to move. The obstacle is, for example, a groove, a step, a curbstone, a pole, and a person. The parking frame is, for example, a white line showing a parking space. The road indication serves as a mark around the vehicle.

The present applicant notes detection of an edge of a white line, which is a mark around the vehicle, from an image, which is moved to the outside of a view area, and indication of the edge combined with a present raw image so as to secure a view around the vehicle and perform detection of the white line without a high-level image processing. In the processing for detecting the edge of a white line, an object other than a white line may be erroneously detected from the obtained image. Consequently, the object (noise) other than a white line is drawn as a white line. Therefore, dots in the same color as that of a white line and the like are drawn in an area other than a white line in an image indicated on the display device. Thus, an image hard to be recognized is provided to a driver.

In view of the applicant's note, the microcomputer 1 obtains image information on at least one of the brightness and the color of the image and position information on the image from the image obtained by using the camera 7. Thus, the microcomputer 1 detects an object based on the obtained image information. The obtained image information is associated with the position information on an image and stored in the memory 5 as history data. The microcomputer 1 detects an object from the obtained image information according to a specific feature on the image. The specific feature on the image is a characteristic feature of the object on the image generated based on the image information. The specific feature is, for example, a feature of the color, a feature of the brightness, a feature of the luminosity, a feature of the shape, and the like. The microcomputer 1 functions as an object detection unit for extracting a specific feature of the image so as to detect a detection object equivalent to a specific feature.

For example, the microcomputer 1 employs a detecting method of an object to detect a range, in which the brightness or the color is different from an image around the range, as a detection object. One example of the detecting method of an object using the microcomputer 1 as the object detection unit will be described later. The microcomputer 1 controls a time point and a position where a generated image is indicated on the display device 9. The microcomputer 1 further functions as a display control unit for controlling an image indicated on the display device 9. The microcomputer 1 further functions as a control device for receiving a signal from the vehicle movement detecting unit 2, a vehicle state detecting unit 3, the memory 5, the graphic processing circuit 4, and the like, performing a predetermined computation, and outputting an image data as a computation result to the graphic processing circuit 4. The microcomputer 1 includes a read only memory (ROM) storing a computation program and the like and a random access memory (RAM) for functioning as a workspace of a computation. The microcomputer 1 executes the program stored in the ROM. The microcomputer 1 reads information necessary for executing a program and temporarily stored in the memory 5 and the RAM.

Figure 7:
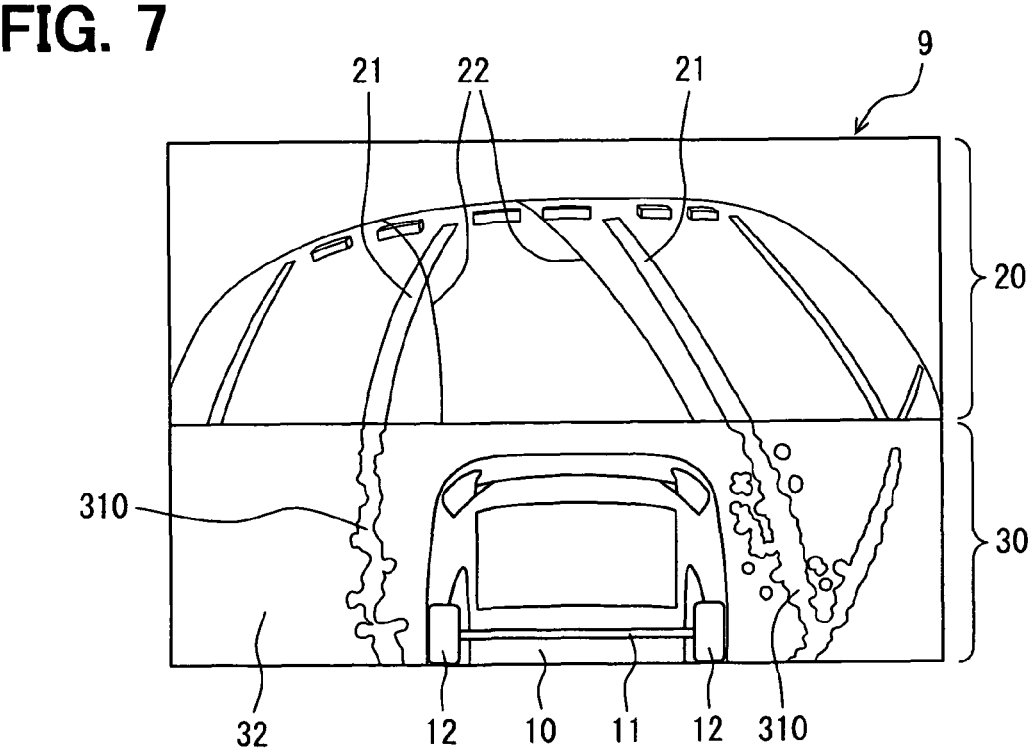
FIG. 7 is a view showing an image indicated when an object detection operation according to the embodiment is not performed.

The graphic processing circuit 4 functions as a drawing unit for generating an image, outputting a generated image to the display device 9, and communicating with the microcomputer 1 functioning as an object detection unit. The graphic processing circuit 4 generates (draws) an image based on the processing result of image processing performed by the microcomputer 1 on the display device 9. The graphic processing circuit 4 generates a predetermined image based on a generation instruction provided from the microcomputer 1 for generating the predetermined image. Therefore, the microcomputer 1 and the graphic processing circuit 4 function as an image generating unit for generating an image. The graphic processing circuit 4 outputs a raw image on the rear side of the vehicle obtained by using the camera 7 to locate the raw image in a rear image display region 20 (FIG. 7). The graphic processing circuit 4 superimposes at least one of an on-road object around the rear side of the vehicle and a road indication, which are extracted from the history data, and the vehicle CG on a history display region 30 to be viewed from the above-mentioned predetermined viewpoint. Thus, the graphic processing circuit 4 outputs the superimposed view to the display device 9. The graphic processing circuit 4 may indicate at least one of the position of an axle portion 11 of the vehicle 10 and wheels 12 on the history display region 30. The graphic processing circuit 4 adds distortion of the vehicle rear image in the rear image display region 20 to the image in the history display region 30. The graphic processing circuit 4 further draws the extracted on-road object or the road indication in the history display region 30 to be indicated continuously with the on-road object or the road indication currently indicated in the rear image display region 20. The graphic processing circuit 4 performs a processing for drawing an image by generating gradation data for each pixel of the display device 9. The microcomputer 1 performs a processing for obtaining history data from the memory 5 and executes a processing for generating the gradation data of an image with reference to information stored in the ROM, while temporarily storing information required for a processing in the RAM. The graphic processing circuit 4 outputs the gradation data of an image as a computation result to the display device 9.

The display device 9 has a display screen including a peripheral image display region and the history display region 30. The peripheral image display region indicates a present vehicle peripheral image obtained by using the camera 7. The history display region 30 is located adjacent to the peripheral image display region for indicating an image generated based on the history data. The display device 9 indicates the vehicle peripheral image in a predetermined vehicle state and indicates an image on the rear side of the vehicle in the peripheral image display region when, for example, a shift position of a transmission device of the vehicle 10 is in a reverse position. The display device 9 has the rear image display region 20 and the history display region 30. The rear image display region 20 indicates a present vehicle rear image obtained by using the camera 7 without correction of distortion in the image when the vehicle 10 moves rearward. The rear image display region 20 is one example of a peripheral image display region. The history display region 30 is adjacent to the rear image display region 20 for indicating the image produced according to previous history data. The history display region 30 indicates an object, which is detected by the microcomputer 1 from obtained image information, at a position, which is determined based on associated position information. The display device 9 is, for example, a liquid crystal display and located in front of a handle or located in a part of a meter indicator of the vehicle in a center portion of a dashboard. In the present embodiment, a dot matrix type TFT transmissive liquid crystal panel is employed as one example of the display device 9. The TFT transmissive liquid crystal panel has multiple pixels allotted in the shape of a matrix and functions as an indication unit for indicating an image. Each pixel of the display device 9 includes sub pixels having color filters respectively in three colors including red (R), green (G), and blue (B) and capable of indicate an image in color. The display device 9 drives each pixel based on the gradation data obtained from the graphic processing circuit 4 for indicating an image. The display device 9 includes a backlight device (not shown) on the rear side of the indication side for lighting an image from the rear side to perform a transmissive indication of the image. The display device 9 may be located in the dashboard near a windshield. According to the present structure, a driver can visually recognize a rear image in a easy state where the diver views the vehicle front side, without moving an eyesight toward to the front side near the handle. The display device 9 may be located at a center of the dashboard in the vehicle width direction and tilted on the dashboard. Alternatively, the display device 9 may be located on a liquid crystal display of a car navigation device.

The vehicle movement detecting unit 2 detects a distance, by which the vehicle 10 moved from a specific state, based on a rotation speed of the wheel and the like, detects a present yaw direction based on a rotation angle of the steering wheel and the like, and transmits a signal, which indicates detected movement to the microcomputer 1. The movement and the yaw direction may be obtained by converting the image to a bird's-eye view image and calculating by matching its previous image with its present image. The vehicle state detecting unit 3 receives detection signals of various states of the vehicle 10. In the present embodiment, the vehicle state detecting unit 3 receives at least a signal of the shift position of the transmission device and transmits the received signal to the microcomputer 1.

The microcomputer 1 may receive a signal outputted from a sonar device 6. The sonar device 6 functions as an object detection unit for detecting an on-road object around the vehicle and detecting the distance of the on-road object from the vehicle 10. The sonar device 6 obtains position information on an on-road object. The obtained position information is associated with the above-mentioned image information obtained from an image obtained by using the camera 7. The sonar device 6 is, for example, an ultrasonic sensor and configured to detect the distance of a solid object or the like, which exists around the vehicle, from the vehicle. The sonar device 6 outputs a detection signal to the microcomputer 1. For example, a predetermined number of sonar devices 6 are embedded in a surface of a rear portion of the vehicle at a prescribed interval. More specifically, each of the sonar devices 6 has a detection unit, which is, for example, exposed from the rear bumper 10a.

Figure 3:
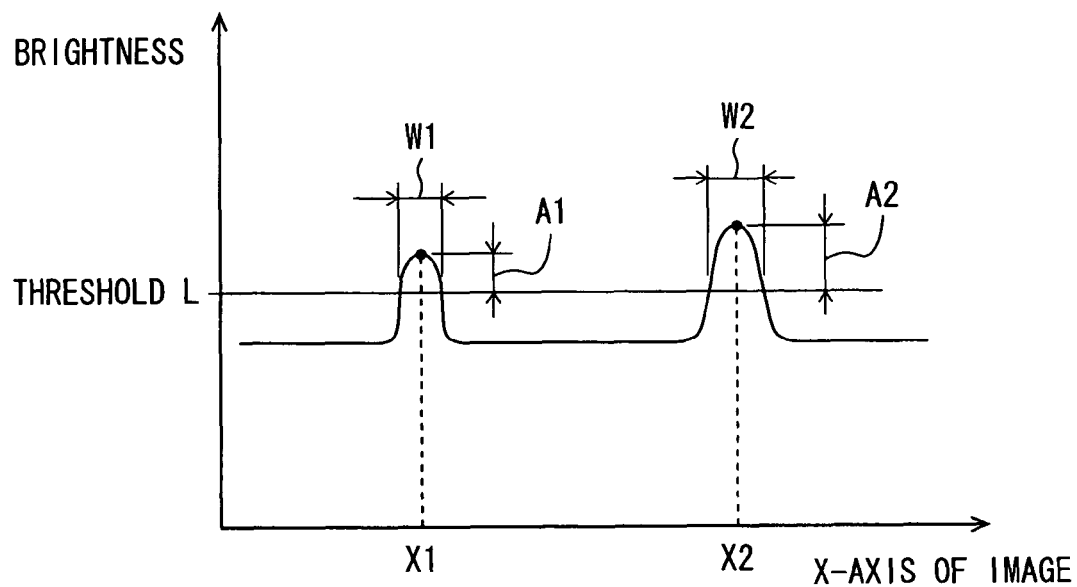
FIG. 3 is a graph showing a distribution of a brightness in an obtained image for describing a method for detecting a white line on a road surface as a detection object from the obtained image.

As follows, one example of a detection operation of an object will be described with reference to FIG. 3. In the detection operation, the microcomputer 1 obtains an object from obtained image information according to a specific feature of the image. FIG. 3 is a graph showing a distribution of a brightness in an obtained image for describing a method for detecting a white line on a road surface as a detection object from the obtained image. As follows, detection of a white line of a parking frame as one example of a detection object will be described. Further, in the one example, information on the level of the brightness of an image is employed as the image information obtained from the image.

The microcomputer 1 detects change in the brightness of an image from a previous image stored in the memory 5 accompanied with movement of the vehicle 10 and plots the change on an imaginary two-dimensional coordinates on the screen, thereby to produce a distribution in the brightness in the two-dimensional coordinates. In the raw image on the rear side of the vehicle shown in FIG. 6, the two-dimensional coordinates include, for example, the X coordinate movable in the horizontal direction and the Y coordinate movable in the vertical direction. In the distribution of the brightness shown in FIG. 3, the X-axis of an image is associated with the horizontal axis, and the magnitude of the brightness is associated with the vertical axis. The microcomputer 1 first fixes a vertical position (Y coordinate) in an image in the Y-axis in the two-dimensional coordinates, and extracts brightness change in the image by changing only the horizontal position (X coordinate) on the image along the X-axis. That is, the image is scanned in the X-axis. Thus, the microcomputer 1 produces a distribution in the brightness accompanied with the change in the X coordinate. In the distribution of the brightness accompanied with the change in the X coordinate, the brightness of a portion, which corresponds to a white line in the image at the horizontal position (X coordinate) in the X-axis, is higher than the brightness of another portion in the X-axis. It is caused, because a road surface is indicated in the image in a color such as black of an asphalt material deeper than the color of a white line, which is a road indication.

A portion in which the brightness is higher than the circumference of the portion is in a range in which the brightness level is different from the circumference in the image. In FIG. 3, the portion appears in each of the two points X1 and X2 in the X-axis. The two points X1 and X2 include ranges in each of which the brightness level is different from the circumference. The two points X1 and X2 includes a mountain-like portion, which has the width W1 in the X-axis, on the left side in FIG. 3, and a mountain-like portion, which has the width W2 in the X-axis, on the right side in FIG. 3. The mountain-like portion on the left side is substantially symmetric with respect to the center on the coordinate X1 in the X-axis, and the mountain-like portion on the right side is substantially symmetric with respect to the center on the coordinate X2 in the X-axis. The coordinate of the center of the mountain-like portion is the coordinate of the center of a white line in the X-axis detected from the image. Each of the values of the width W1, W2 of the mountain-like portion is the width of a white line. Both ends of each of the width W1 and the width W2 in the horizontal direction correspond to edge portions of a white line.

Multiple distributions of the brightness accompanied with change in the horizontal position in the X-axis produced in this way are extracted and detected, while the vertical position in the Y-axis is changed. That is, the scanning of the image in the X-axis direction is continued, while the vertical position in the Y-axis is changed. As the coordinate in the Y-axis is increased, i.e., as the change in the vertical position in the Y-axis is increased while scanning is continued, the portion, which is higher in the brightness than the circumference in distribution of the brightness accompanied with change in the X-axis, becomes an actual white line on the image.

Figure 8:
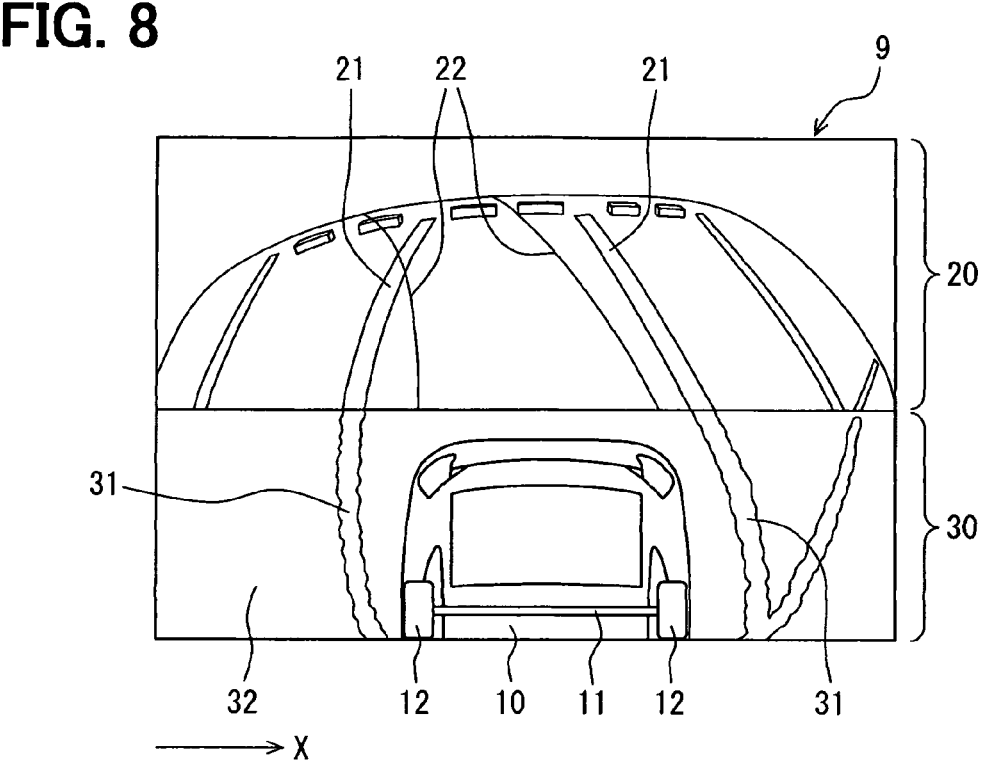
FIG. 8 is a view showing an image indicated by the vehicle rear display device according to the embodiment when the vehicle is parking rearward.

By employing the detection method of a white line in this way, the indication of the image in the display device 9 shown in FIG. 7 can be changed to the indication shown in FIG. 8. FIG. 7 is a view showing an image indicated when a white line detection operation (object detection operation) according to the embodiment is not performed. FIG. 8 is a view showing an image indicated when the white line detection operation according to the embodiment is performed and when the vehicle is parked rearward. In the indication of FIG. 7, the display device 9 indicates noise, which is not actually a white line, as a white line. Therefore, dots in the same color as the color of a white line 310 are indicated in a portion on a road surface 32, on which a white line does not actually exist. Consequently, an unclear image is provided to a driver. On the contrary, when the white line detection operation according to the present embodiment is performed, as shown in FIG. 8, the white line 31, which can be further clearly recognized as a line, is indicated with less noise on the road surface 32 in the history display region 30.

Detection of a white line may be performed by storing only an edge portion of a white line associated with the coordinates (position information), instead of detecting the distribution of the change in the brightness on the two-dimensional coordinates. In this way, data processing and both a work area and a processing time required for the data processing can be reduced in the white line detection operation. A white line may be drawn by detecting position information including the coordinates of only the center portion of each of the width W1 and width W2 from the distribution of the brightness on the two-dimensional coordinates and allocating dots (for example, white point) in a predetermined color and a predetermined size at a position corresponding to the detected position information in the history display region 30. For example, when the detected white line has the width of 11 pixels, a white circular symbol of 8 pixels in diameter may be drawn on each edge of the white line. In this way, data processing and both a work area and a processing time required for the data processing can be further reduced in the white line detection operation and a drawing operation. The detected brightness of a white line may be reflected on the image in the display device 9. The reason will be described as follows. A predetermined threshold L shown in FIG. 3 is a reference value for determining whether an object is a white line. The reference value may be a predetermined value beforehand stored in the microcomputer 1. Alternatively, the reference value may be a value obtained by a predetermined calculating method using an average brightness of the entire image.

As the object detection unit, the microcomputer 1 detects a difference between the brightness of an image, which is image information of the object, and the threshold L. When the difference changes according to the position in the X-axis, the difference is detected for each pixel, and the brightness according to the detected difference is calculated for each pixel. Thus, the microcomputer 1 calculates the brightness according to the difference between the detected image information of a white line (object), and the threshold L. The microcomputer 1 causes the graphic processing circuit 4 to draw a white line (object) in the history display region 30 such that the brightness of the white line is in the brightness calculated for each pixel. The graphic processing circuit 4 draws a white line in the calculated brightness and causes the history display region 30 to indicate a white line, which reflects the detected brightness. Therefore, the white line indicated in the history display region 30 is not in the same brightness as a whole. The white line reflects the actual brightness when the image is obtained, and thereby the white line is indicated substantially in the actual brightness.

As shown in FIG. 3, the white line portion on the left side in FIG. 3 has the difference A1 between the brightness (image information) of the image in the center of the mountain-like portion and the threshold L, and the white line portion on the right side in FIG. 3 has the difference A2. The microcomputer 1 may calculate only the difference between the brightness in the center of the mountain-like portion and the threshold L in this way and may cause the graphic processing circuit 4 to draw an entire white line in the history display region 30 such that the entire white line is in the brightness calculated in the center. Thus, the graphic processing circuit 4 draws a white line in the brightness of the center and causes the history display region 30 to indicate the white line in the brightness. In this case, the white line indicated in the history display region 30 is in the same brightness as a whole.

The microcomputer 1 may cause the history display region 30 to indicate the white line 31 to be continuous with a white line 21 in the rear image display region 20 such that the driver can recognize a history of the white line, which is presently out of a view area of the driver. In the present condition, in view of the processing, the number of change in the coordinate in the Y-axis may be preferably reduced. In addition, the number of plots may be preferably reduced and extracted compared with a number of plots sufficient for forming a complete locus of the white line. Thus, according to the white line detection performed by the microcomputer 1, when a white line is detected as a line on the image, the white line is detected as an aggregation of plots of multiple points. In this way, data processing and both a work area and a processing time required for the data processing can be further reduced.

By employing the detecting method of a white line, processing load and a work area of a memory can be reduced in the vehicle rear display device. Therefore, a high-performance control device for controlling, for example, a car navigation device need not be provided, and a control device for controlling, for example, a meter indicator may suffice. Further, when information on the level of the color of an image is employed as the image information obtained from the image, the detecting method of a white line is equivalent to that of the description with reference to FIG. 3 In this case, each of an R value (red level), a G value (green level), and a B value (blue level), which constitute three primary colors of the image, is equivalent to the brightness specified by the vertical position in the Y-axis in FIG. 3. Further, a range, in which the color of an image is different in the level from the circumference of the image, is detected based on a value, which conforms to the color of an object to be detected, and a rate of the values. Thus, the detected range is associated with the position information and stored in the memory 5. Other portions of the present detecting method are equivalent to those of the detecting method based on the brightness. Thus, the white line 31 in the brightness and the color according to the image information of the detected white line is drawn in the history display region 30.

Figure 4:
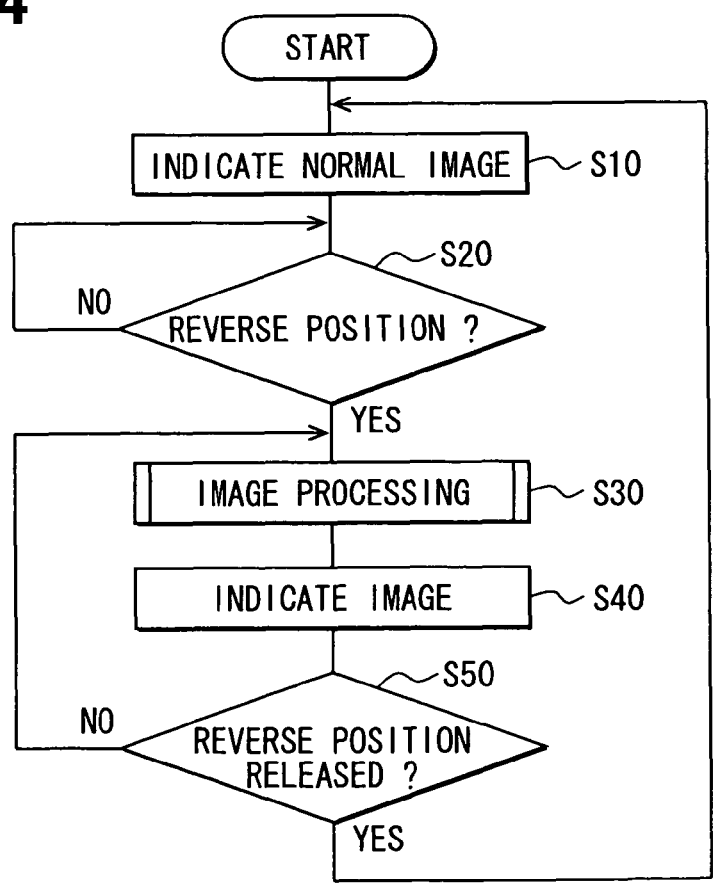
FIG. 4 is a main flow chart showing an operation of a vehicle rear display device when the vehicle is parked rearward.
Figure 5:
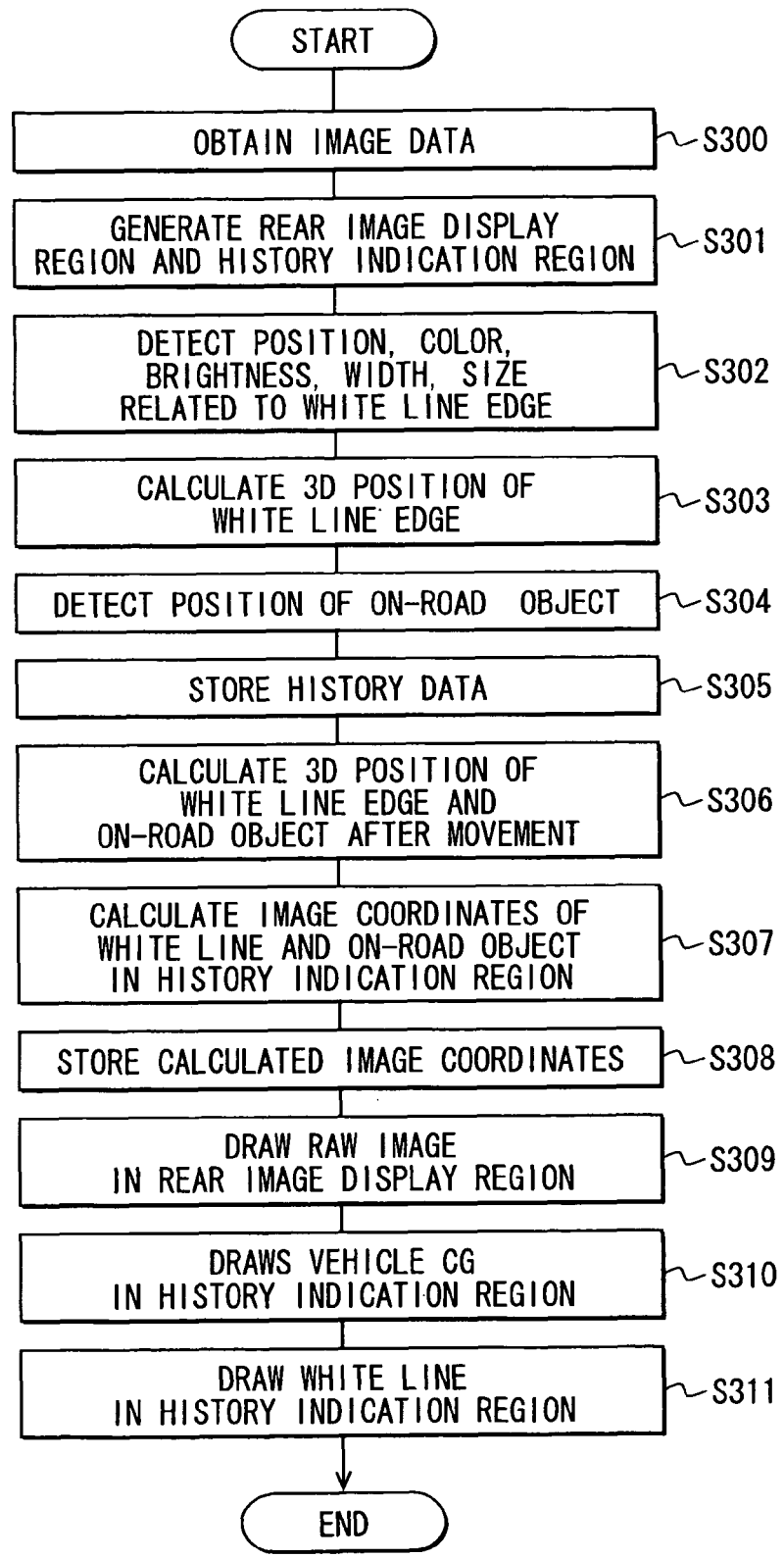
FIG. 5 is a subroutine of the main flow chart for an image processing.

Subsequently, an operation performed when the vehicle parks rearward will be described as one example of an operation of the vehicle rear display device. FIG. 4 is a main flow chart showing the operation of the vehicle rear display device performed when the vehicle parks rearward. FIG. 5 shows a subroutine of an image processing in the main flow chart. The flow charts of FIGS. 4 and 5 are executed by the microcomputer 1, which also functions as a control device for controlling an operation of the vehicle rear display device.

The main flow chart of FIG. 4 is started when electric power is supplied to the microcomputer 1. First, at step 10, the display device 9 indicates an image other than a vehicle rear image in a normal condition. At step 20, the microcomputer 1 determines whether the microcomputer 1 receives a signal, which specifies a shift position of a transmission device to be in a reverse position, from the vehicle state detecting unit 3. The microcomputer 1 repeats the determination at step 20 until the microcomputer 1 receives the signal specifying the reverse position. At step 20, it may be determined whether the vehicle state detecting unit 3 or the microcomputer 1 receives a signal of an instruction to indicate a peripheral image of the vehicle on the display device 9. The signal of an instruction is received when, for example, an occupant manipulates a switch for instructing to indicate the peripheral image of the vehicle. In this case, the image indicated on the display device 9 may be selected according to the direction, in which the vehicle moves. When the vehicle moves forward, an image ahead of the vehicle may be indicated on the display device 9. An occupant may manipulate a switch for instructing to select an image of a side of the vehicle.

When the signal specifying the reverse position is received at step 20, the present processing proceeds to step 30 at which the microcomputer 1 executes a subroutine for an image processing so as to produce an image to be outputted to the display device 9. The image is drawn (generated) through the processings of step 300 to step 311 in FIG. 5 in the subroutine for the image processing. When the drawn image is outputted from the graphic processing circuit 4 to the display device 9, at step 40, a screen including the rear image display region 20 and the history display region 30 is indicated.

The image to be indicated on the display device 9 at step 40 is continually obtained and drawn from the reception of the signal, which specifies the rear movement of the vehicle, at step 20 while the vehicle moves. The image in the rear image display region 20 in real time and the image in the history display region 30 continuous with the image in the rear image display region 20 are continually indicated on the display device 9 until the shift position of the reverse position is determined to be released at step 50. When a negative determination is made at step 50, the processing proceeds to step 30 at which the subroutine of the image processing is continually executed. Thus, the image in the history display region 30 continuous with the image in the rear image display region 20 in real time are drawn according to movement of the vehicle 10. Further, the drawn images are indicated in the history display region 30 on the display device 9. When a positive determination is made at step 50, the processing returns to step 10 at which indication of the rear image display on the display device 9 is canceled. In general, an ignition switch is turned off when the vehicle is parked. Therefore, the present processing of the flow chart is terminated when the ignition switch is turned off and the microcomputer 1 is deactivated.

Figure 6:
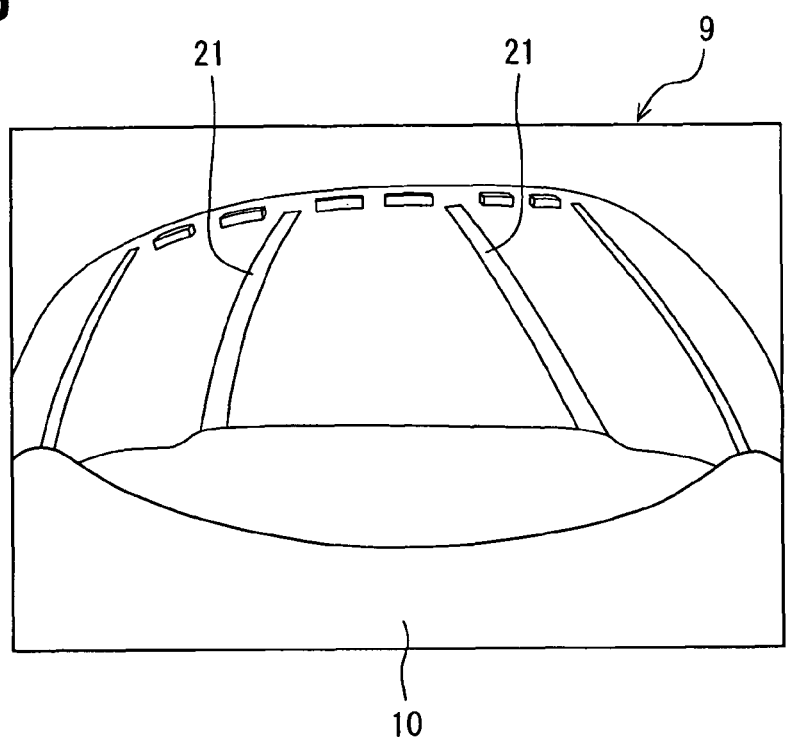
FIG. 6 is a view showing a raw image obtained by using the camera and indicated on an entire screen.

Subsequently, the subroutine of step 300 to step 311 of the image processing will be described with reference to FIG. 5. The camera 7 obtains an image data on the rear side of the vehicle so as to contain a predetermined region. First, the image data is obtained. At step 301, a signal of the image obtained by the camera 7 is outputted as image data through the decoder 8 and the graphic processing circuit 4 to the memory 5 and the microcomputer 1. The image data is converted into data on imaginary coordinates on the screen with movement of the vehicle 10. The converted image data is stored and accumulated in the memory 5. The obtained image data is not actually indicated as it is on the display device 9. Supposedly, when the obtained image data is actually indicated, a rear image is indicated on the upper half of the screen, and a rear portion of the vehicle 10 is indicated on the lower half of the screen, in the view shown in FIG. 6. FIG. 6 is a view showing a raw image obtained by the camera 7 and indicated on the entire screen.

At step 301, the graphic processing circuit 4 executes a processing to generate the history display region 30 and the rear image display region 20 and assign the history display region 30 and the rear image display region 20 to the screen. As shown in FIG. 7, the rear image display region 20 is located at the upper portion of the screen, and the history display region 30 is located at the lower portion of the screen to be adjacent to the rear image display region 20. FIG. 7 is a view for explaining one example of a screen to be indicated when the vehicle is parked rearward.

At step 302, the microcomputer 1 reads the image data stored in the memory 5 and detects a road indication from the image information obtained from the image by the white line detecting method. In this example, the road indication is the white line 21 of a parking frame. In the present condition, the detected white line 21 is converted to a form on the imaginary coordinates (image coordinates) of the image. The position (position information), the color, the brightness, and the size such as the width related to an edge (white line edge) of the white line in the image are detected. At step 303, image coordinates related to the white line edge are converted into three-dimensional coordinates. Thus, the position (3D position) of the white line edge in the three-dimensional space is calculated.

At step 304, when the sonar device (object detection unit) 6 detects an on-road object such as a vehicle peripheral obstacle, the sonar device 6 outputs the detected position of the on-road object and the detected distance of the on-road object from the vehicle 10 to the microcomputer 1. When the on-road object detected by the sonar device 6 is the same as the object detected by the microcomputer 1 from the image, the position information including the position, the distance, and the like detected by the sonar device 6 is used for correcting and complementing the position information obtained from the image. At step 305, the microcomputer 1 associates the image information of the white line 21 converted into the image coordinates with the position information of the converted white line 21 and stores the associated information in the memory 5 as history data.

At step 306, the 3D position of the white line edge and an on-road object, which moves on the screen according to movement of the vehicle 10, is calculated. Specifically, while the vehicle 10 moves, the microcomputer 1 reads the 3D position (history data) related to the white line edge and the on-road object stored in the memory 5 and calculates the 3D position after movement of the vehicle according to the movement of the vehicle and the rotation angle (steering angle of the handle) detected by the vehicle movement detecting unit 2 thereby to update the 3D position.

At step 307, the microcomputer 1 calculates and updates the image coordinates of the 3D position related to the white line edge and the on-road object updated at step 306 so as to indicate the white line 31 and the on-road object in the history display region 30 continuously with the raw image in the rear image display region 20. At step 308, the microcomputer 1 stores the calculated image coordinates in the memory 5.

Subsequently, at step 309 to step 311, the graphic processing circuit 4 draws an image to be indicated on the display device 9 based on the output signal from the microcomputer 1. Specifically, at step 309, the graphic processing circuit 4 draws a present rear image (raw image) of the vehicle and the like in the rear image display region 20. At step 310, the graphic processing circuit 4 reads a vehicle CG, which is beforehand stored in the memory 5, and draws a vehicle CG, which is viewed from a predetermined viewpoint, in the history display region 30. In the present drawing, the vehicle CG is added with distortion, which is similar to distortion caused in the raw image in the rear image display region 20, and the distorted vehicle CG is drawn in the history display region 30. At step 311, the graphic processing circuit 4 reads the position, the color, the brightness, and the size such as the width of the image coordinates of the white lines road indication and the like) stored in the memory 5. Thus, the graphic processing circuit 4 draws the white line 31 including the white line edge, which is viewed from the predetermined viewpoint, in the history display region 30. In the present drawing, at step 310, the read white line is applied with a generally-known viewpoint conversion to be viewed from the same predetermined viewpoint as the position of the vehicle CG. Further, distortion same as the distortion of the raw image in the rear image display region 20 is added to the white line. Thus, the daringly distorted white line 31 is drawn similarly to the vehicle CG.

As follows, an example of a detailed operation for adding distortion to the image at step 310 and step 311 will the described. First, a correction is performed to remove distortion in an image of image data previously obtained by using the camera 7. Further, the corrected image data is converted into image data in the three-dimensional coordinates. The three-dimensional space is converted and moved (rotated, parallel-shifted, and the like) according to movement of the vehicle based on signals of movement and rotation of the vehicle. Thus, an accurate position of the self-vehicle is maintained. The image data converted into the data in the three-dimensional coordinates is further converted into data in the imaginary coordinates on the screen thereby to form two-dimensional data. Distortion of the raw image is added to the converted two-dimensional data. Thus, the vehicle CG and the white line 31 added with distortion, which is similar to distortion of the raw image, can be drawn in the history display region 30.

In FIG. 4, at step 40, the image drawn in the history display region 30 at step 310 and step 311 is combined (synthesized) with the image drawn in the rear image display region 20 at step 309. Thus, the combined images in the two adjacent regions are outputted and indicated on the display device 9.

By executing the above image-processing subroutine, as shown in FIG. 8, the raw image including the white line 21 in the rear image display region 20 and the white line 31 in the history display region 30 are continuously indicated across the boundary between the two regions. It is noted that the white line 31 can be clearly and distinctively indicated with reduced conspicuous noise. In addition, the white line 31 can be drawn to have substantially the same width in substantially the same color as those of the white line 21 across the boundary between the rear image display region 20 and the history display region 30. Thus, the white line 31 can be indicated to be coincide with the white line 21. In other words, the white line 31, which is located around the periphery of the vehicle body and presently out of the view area of the camera 7, and the white line 21, which is located on the rear side of the vehicle and presently viewed by the camera 7, are integrally indicated on the display device 9. Thus, an image of the periphery of the vehicle, which is significantly enhanced in the viewability, can be provided to the diver. In this way, the driver can be provided with the previous image, which indicates a mark (white line 31) effective for accurately checking the position of the self-vehicle, and the present image, with indication of the boundary between the previous image and the present image. Thus, the driver can be distinctively and clearly provided with the previous image and the present image as one image without uncomfortable feeling. Therefore, the driver can obtain clearly and correctly the physical relationship among the vehicle body, the road indication, which is drawn in the circumference of the vehicle body, and the present rear image.

As shown in FIG. 8, the graphic processing circuit 4 may superimpose an expected path line 22 of the vehicle 10, an extension lines of the lateral sides of the vehicle, and the like on the image in the rear image display region 20. The expected path line 22 is an indicator showing an expected locus of the vehicle moving rearward based on the angle of the handle. The expected path line 22 and the extension lines of the lateral sides of the vehicle may be drawn in different colors so as to be clearly distinctive form the driver.

Figure 9:
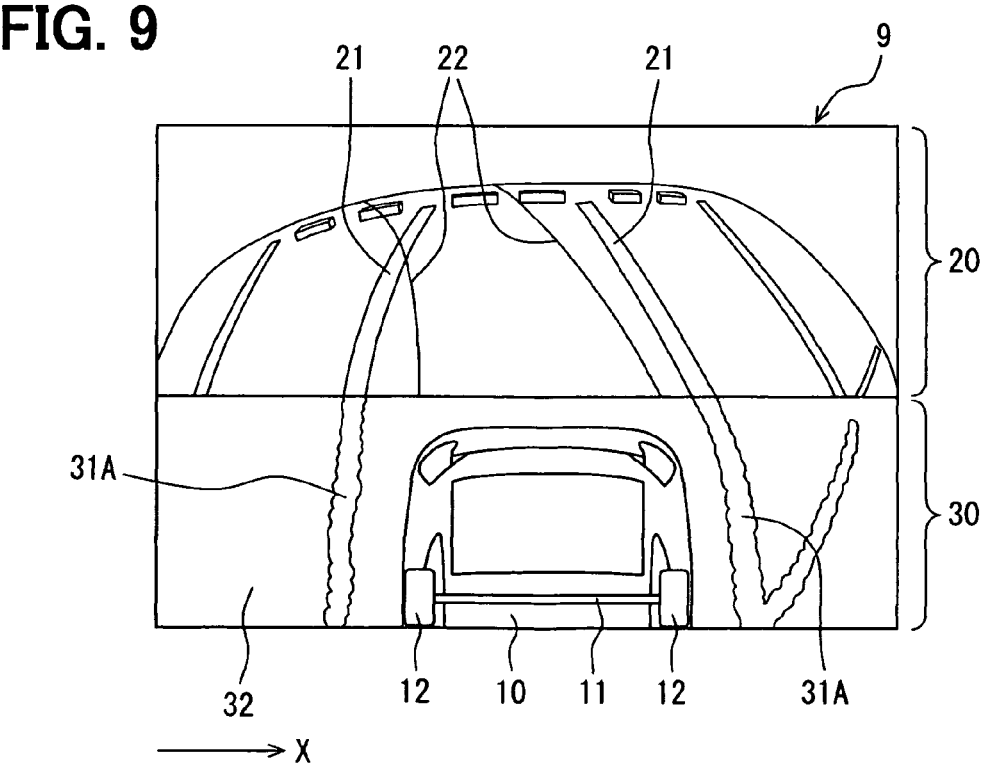
FIG. 9 is an image showing a corrected white line when a correcting operation for a white line in a history display region of FIG. 8 is performed.

Further, as shown in FIG. 9, the graphic processing circuit 4 may reduce distortion added to a white line 31A drawn in the history display region 30 to correct the white line 31A further linearly at a position distant from the boundary with the rear image display region 20. FIG. 9 is a view showing an example of a corrected white line 31A obtained by correcting the white line 31 in the history display region 30 in FIG. 8. In this way, the white line 31A is indicated as a single line continuous with the white line 21 in the raw image on the boundary with the rear image display region 20, and the white line 31A is not largely curved at a position distant from the boundary with the rear image display region 20.

As follows, an operation effect of the vehicle rear display device according to the present embodiment will be described. The vehicle rear display device indicates the vehicle peripheral image when receiving the signal indicating start of rear movement of the vehicle 10.

The display device 9 includes: the camera 7 for obtaining the image on the rear side of the vehicle; the microcomputer 1 (object detection unit) for detecting the white line 31 from the obtained image; the memory 5 (storing unit) for storing data obtained as history data from the previous image photographed by the camera 7 and storing a beforehand drawn image on the rear side of the vehicle, such that the beforehand drawn image has an accurate physical relationship with the photographed image; and the graphic processing circuit 4. The rear image display region 20 indicates the present vehicle rear image photographed by the camera 7 without correction of distortion in the image. The history display region 30 is adjacent to the rear image display region 20 and indicates an image produced using the history data. The white line 31 is an example of at least one of an on-road object and a road indication. The microcomputer 1 obtains the image information, which is related to a level of at least one of the brightness and the color on the image, and the position information on the image from the photographed image. The microcomputer 1 detects the white line 31 based on the image information. The memory 5 beforehand stores an image of the rear portion of the vehicle. In addition, the memory 5 associates the image information with the position information about an object detected by the microcomputer 1 and stores it as history data. The graphic processing circuit 4 superimposes the image of the rear portion of the vehicle stored beforehand on the image of the white line 31 around the rear portion of the vehicle, the image of the white line 31 being extracted from the history data, in the history display region 30 such that the superimposed images are viewed from a predetermined viewpoint. The microcomputer 1 detects an object from the obtained image information according to a specific feature of the image. For example, the microcomputer 1 detects a range of the image information, in which the image is different from the circumference in the level of the brightness or the color, as an object. In the present structure, the present vehicle peripheral image is indicated in the peripheral image display region. In addition, the object detected from the image information by the microcomputer 1 is drawn in the history display region at the position determined based on the associated position information.

According to the above structure, the following operation effects are obtained. The image information related to the level of at least one of the brightness and the color of the photographed image is used in detection of an object. Therefore, detection of an object can be performed while reducing a processing load for processing the image information. Further, the image information is obtained by the detection operation based on the brightness or the color, and the position information on the image is obtained. The image information is associated with the position information and stored as the history data. Whereby, the position and the size of the object can be detected with sufficient accuracy. In addition, a data volume of the stored history data can be also reduced. The microcomputer 1 (object detection unit) detects an object from the obtained image information based on the specific feature in the image. The graphic processing circuit 4 draws the object at the position in the history display region 30 based on the position information. Therefore, the image with few noises can be indicated on the display device 9. In addition, the driver can view the image reduced in ambiguity. Thus, an operation load applied to the microcomputer 1 for the image processing can be reduced. In addition, the driver can correctly recognize the position of the self-vehicle on the screen enhanced in the viewability. Consequently, the function of the parking assistance can be enhanced.

Further, the white line 31 (object) in the brightness and the color according to the image information of the detected white line (object) is drawn in the history display region 30. According to the present structure, compared with the conventional white line indicated in the uniform brightness and the uniform color, the present white line is indicated in the color tone further viewable from the photographed image. Specifically, even when a noise is detected in a portion of the image where the white line 31 does not actually exist, the portion of the image where the noise is detected is indicated in the same level of the brightness and the same level of the color obtained from the image. Therefore, even when a noise is detected, and the detected noise is indicated in the portion of the image, the portion of the image is not indicated in the color of a specified white line. Thus, a noise is inconspicuously indicated in the image on the display screen.

Further, the microcomputer 1 (object detection unit) detects a difference between the image information of the white line 31 (object) and the predetermined threshold L. In the history display region 30, the white line 31 (object) is indicated in the brightness and the color according to the difference between the detected image information of the white line 31 (object) and the threshold L. According to the present structure, the white line 31 is indicated in the brightness and the color according to the difference between the level of the brightness or the level of the color in the range detected as the white line 31 and threshold L. Therefore, compared with the conventional white line indicated in a uniform brightness and a uniform color, the white line can be indicated in the color tone further similarly to the brightness and the color of the photographed image. That is, even when a noise is detected in a portion of the image where the white line 31 does not actually exist, the portion of the image where the noise is detected is indicated in the same level of the brightness and the same level of the color obtained from the image. In this way, dissimilarly to the conventional method, a dot in the predetermined size for specifying a white line is not drawn in a portion of the image where a noise is detected. Therefore, even when a noise is detected, and the detected noise is indicated in the portion, of the image, the portion of the image is not indicated in a specified white color. Thus, a noise is inconspicuously indicated in the image on the display screen.

Furthermore, the microcomputer 1 (object detection unit) detects the width of the white line 31 (object) from the detected image information of the white line 31 (object). The white line 31 (object) with the width, which corresponds to the detected width, is drawn in the history display region 30. According to the present structure, the width of the white line 31 (object) indicated in the history display region 30 is specified based on the width of the detected white line. Therefore, the white line 31 with the specified width can be clearly indicated. Thus, the edge of the white line 31 can be also clearly indicated. In this way, a driver can be clearly notified of existence of the white line 31. Thus, assistance of the driving operation can be enhanced.

The road surface other than the image of the rear portion of the vehicle and the white line 31 (object) to be indicated in the history display region 30 may be drawn in at least one of the average color of the road surface and the average brightness of the road surface obtained from the obtained image information. According to the present structure; the road surface can be indicated in the average color and average brightness near the color of an actual road surface in the history display region 30. By indicating the road surface in at least one of the average color and the average brightness, noise can be further reduced in the screen. Further, the road surface can be further distinctive from the white line 31 (object) in the image. Thus, recognition of the driver can be further enhanced.

Furthermore, the sonar device 6 (object detection unit) may be further provided for detecting an on-road object around the vehicle periphery, the distance of an on-road object from the vehicle 10, and the position information on an on-road object. According to the present structure, the position information on an on-road object can be complemented by the sonar device 6. Thus, the position of an on-road object can be further accurately notified to a driver, and assistance of a driving operation can be further enhanced.

The scale line may be drawn in the history display region 30 for showing a predetermined distance from the vehicle 10. The distance from the vehicle shown by the scale line may be determined according to the position information on an object. The present distance may be determined according to distance information detected by the sonar device 6 as an object detection unit. In this way, an on-road object and/or a road indication, and the scale line are drawn around the vehicle 10 in the history display region 30. Therefore, the driver can recognize the position of the vehicle relative to a space around the vehicle periphery in detail. Thus, assistance of a driving operation can be further enhanced.

The vehicle 10 is indicated with the position of the axle portion 11 and the wheel 12 in the history display region 30. In this way, a driver can be clearly notified of the position of the axle portion 11 and the wheel 12 relative to the condition around the vehicle periphery by indicating the position of the axle portion 11 and the wheel 12 in the history display region 30. Thus, a further enhanced guidance image for a driving operation can be provided.

Further, the vehicle rear display device detects the white line 21 (parking frame), which shows a parking space as a road indication, and the like as a detection object. The vehicle rear display device further indicates the detection object continually over the present image in the rear image display region 20 and the image, which is produced from previous data, in the history display region 30. In this way, the road indication, which is not a three-dimensional object, is detected from the photographed image. Therefore, compared with a detection method for detecting a three-dimensional object, a processing performance and a processing time required for an image processing device and a detection apparatus can be reduced. Thus, inexpensive apparatus can be produced.

The rear image display region 20 indicates a present image around the vehicle periphery photographed by the camera 7 without correction of distortion in the image. In this way, a large area on the rear side of the vehicle in a range of, for example, 180 degrees can be indicated. Consequently, an indication range on the rear side of the vehicle can be enlarged, compared with an indication of an image, in which distortion is corrected. Thus, a driver can obtain enhanced vehicle peripheral information.

The graphic processing circuit 4 adds distortion of the vehicle rear image in the rear image display region 20 to the image in the history display region 30 and draws the distorted vehicle rear image. In this way, a present raw image in the rear image display region 20 can be further visually associated with an image, which is presently out of the view area of the camera 7 and indicated in the history display region 30, by drawing the distorted rear image of the vehicle in the history display region 30. Thus, a driver can further easily recognize a relationship between the vehicle and the periphery around the vehicle presently out of the view area. Furthermore, the graphic processing circuit 4 adds distortion of the vehicle rear image in the rear image display region 20 to the image in the history display region 30. Further, the graphic processing circuit 4 indicates the extracted white line 31 (on-road object or road indication) in the history display region 30 to be continuous with the white line 21 (on-road object or road indication) indicated in the rear image display region 20. In this way, the present raw image in the rear image display region 20 can be visually integrally associated (connected) with the image, which is presently out of the view area of the camera 7, in the history display region 30. Furthermore, the graphic processing circuit 4 corrects an on-road object and/or the white line 31A (road indication) in the history display region 30 to be linear at a portion distant from the boundary with the rear image display region 20 and draws the corrected objects. In this way, the white line 31A and the like are continually drawn near the boundary with the rear image display region 20. In addition, the white line 31A and the like are drawn in the linear shape at a portion distant from the boundary such that distortion added to the rear image in the history display region 30 is removed. In this manner, the white line 31A and the like are drawn in the history display region 30 to be substantially in parallel with the vehicle 10 near the vehicle 10. Thus, discomfort caused by distortion in the image in the history display region 30 can be reduced, while consistency between the image in the rear image display region 20 and the image in the history display region 30 is maintained via the boundary.

The graphic processing circuit 4 may indicate only the CG of the rear portion of the vehicle and the white line 31 (on-road object and/or the road indication), to which distortion of the raw image in the rear image display region 20 is added, in the history display region 30. In this way, only the CG of the vehicle and the white line 31 (on-road object and/or the road indication) are drawn in the history display region 30, and other information is not drawn. Thus, the driver can obtain directly and clearly the physical relationship between the vehicle and a mark such as the white line 31. Further, an image processing load can be reduced by limiting drawn information.

The ground color of the image other than the vehicle CG, an on-road object, and/or a road indication in the history display region 30 may be differed from the color of the road surface in the rear image display region 20. In this assignment of the ground color, the boundary between the image in the rear image display region 20 and the image in the history display region 30 becomes clear. Thus, a driver can easily recognize the image in the upper screen to be a present raw image and the image in the lower screen to be a previous image, which is presently out of the view area, in the integrated composite image on the display device 9. For example, the ground color of the history display region 30 may be different from an actual color of the road surface. Specifically, the ground color may be indicated in black or blue. It is noted that the ground color is indicated in a color different from the color of the vehicle CG. In this way, the two images are further distinctively indicated as separate images in the separate regions. In addition, the vehicle CG, an on-road object, a road indication, and the like can be further distinctively indicated in the history display region 30.

The graphic processing circuit 4 may be controlled by the control device, which controls an operation of a meter indicator. The control device for controlling the graphic processing circuit 4 and a meter indicator may have a relatively small memory and a relatively low processing performance. According to the present structure, reduction in a processing load and a work area of a memory can be further effective in the image processing for generating the simplified previous image and the present image, which are continually connected with each other.

The display device 9 is located in a part of a meter indicator. Specifically, the image on the rear side of the vehicle may be overlapped a meter of the vehicle. According to the present structure, a driver can confirm the image on the rear side of the vehicle, without largely moving a view point, while seeing around the meter.

The graphic processing circuit 4 is controlled by the control device, which controls an operation of the meter indicator. The display device 9 may be located on a dashboard in a vehicle interior. According to the present structure, the image on the rear side of the vehicle is located near the height of a driver's eyes. Thus, a driver can confirm the image on the rear side, without largely moving a view point.

(Other Embodiment)

As described above, the desirable embodiments of the present invention have been mentioned. It is noted that the present invention is not limited to the above embodiments. The present invention may be variously modified and may be in practiced use in a spirit of the present invention.

In the above embodiments, the vehicle rear display device is described as one example of the vehicle periphery display device. It suffices that the display screen indicates a peripheral image display region for showing the present vehicle periphery and a history display region for showing the vehicle periphery presently out of the view area of a camera. For example, a front side of the vehicle and/or a lateral side of the vehicle may be indicated as the vehicle periphery.

In the above embodiment, extraction of a white line (parking frame) as a mark, which is to be drawn in the image in the history display region 30, is described as one example. It is noted that an on-road object other than the white line, such as another road indication, a groove, a step, a curbstone, and a pole may be extracted. An extraction method for such an on-road object may be similar to the above-described method for extracting the edge of a white line.

In the above embodiment, the graphic processing circuit 4 may draw a scale line in the history display region 30 for showing a predetermined distance from the vehicle 10. The scale line may include scale lines drawn at a predetermined interval on the screen for indicating the distance from the vehicle. The scale lines are, for example, drawn in the shape of a lattice arranged in the longitudinal direction and the width direction of the vehicle relative to the vehicle. According to the present example, in addition to the white line 31 (on-road object and/or road indication), the scale lines are drawn around the vehicle 10 in the history display region 30. Therefore, a driver can further in detail recognize an on-road object around the vehicle 10 and a physical relationship with respect to a road indication.

In the above embodiment, the image indicated on the display device 9 at the time of parking is photographed by a single element of the camera 7. Alternatively, multiple images may be photographed by using multiple cameras, and the photographed multiple images may be combined or modified and indicated on the display device 9.

Summarizing the above embodiments, the vehicle periphery display device for indicating an image of a vehicle periphery, includes:

an imaging unit for obtaining an image on a rear side of the vehicle;

an object detection unit for obtaining image information, which is related to a level of at least one of a brightness and a color on an image, and position information on the image from the obtained image and for detecting at least one of a road indication and an on-road object based on the obtained image information;

a storing unit for beforehand storing an image of the vehicle and for storing history data, which include the image information associated with the position information about an object detected by the object detection unit;

a display screen including a peripheral image display region for indicating a present image of a periphery of the vehicle photographed by the imaging unit and a history display region adjacent to the peripheral image display region for indicating an image produced using the history data; and a graphic unit for generating an image including the beforehand stored image of the vehicle and the image produced using the history data, which are overlapped one another and converted to be viewed from a predetermined viewpoint, and for indicating the generated image in the history display region.

Further, the object detection unit detects an object from the image information according to a specific feature, which appears on the image. The present image of the periphery, of the vehicle is indicated in the peripheral image display region. The object detected from the image information is indicated in the history display region at a position according to the associated position information.

In this way, the image information related to a level of at least one of a brightness and a color of the photographed image is used in detection of an object. Therefore, detection of an object can be performed while reducing a processing load for processing the image information. Further, the image information and the position information on the image are detected based on the at least one of the brightness and the color. The image information is associated with the position information and stored as the history data. Whereby, the position and the size of the object can be detected with sufficient accuracy. In addition, a data volume of the stored the history data can be also reduced. The object detection unit detects the object from the obtained image information based on the specific feature in the image. The graphic unit draws the object at the position in the history display region based on the position information. Thereby, the image with few noises can be indicated. In addition, a driver can view the image enhanced in viewability. Therefore, the vehicle periphery display device is capable of reducing discomfort in an image of the periphery of the vehicle, which is presently outside of a view area, and indicating the image. The on-road object and the road indication in the peripheral image display region and the history display region are located in a space, into which the vehicle is moving, and used as a mark around the periphery of the vehicle. The on-road object and the road indication are, for example, a groove, a step, a curbstone, a pole, a person, another car, and a white line, which specifies a parking frame of a parking space. The specific feature on the image is a characteristic feature of the object, which appears on the image indicated based on the image information. The specific feature is, for example, a feature of the color, a feature of the brightness, a feature of the luminosity, a feature of the shape, and the like. The object detection unit extracts the specific feature in the image to detect an object.

According to the embodiment, an object is indicated in the brightness and the color of the image information, which is detected as an object, in the history display region. In this way, the object is indicated in the brightness and the color of the image information detected as an object. Therefore, compared with a conventional white line indicated in a uniform brightness and a uniform color, a white line, which is viewed further similarly to a photographed image, can be indicated in the display screen. In addition, even when a noise is caused in detection of a road indication or an on-road object detect around the periphery of the vehicle, and even when the caused noise is indicated on the screen, the noise can be indicated to be less conspicuous in the image on the display screen. Therefore, an image, in which a noise is relatively less conspicuous, can be generated, and an image enhanced in the viewability can be provided to a driver.

According to the embodiment, the object detection unit may detect a value of a width of an object from the image information detected as an object, and the object having a width, which corresponds to the detected value of the width, may be indicated in the history display region. In this way, the width of the object indicated in the history display region is specified based on the value of the width of the object obtained from the image information detected as an object. Therefore, the object with the width can be clearly indicated, and the edge of the object can be also clearly indicated. In this way, a driver can be clearly notified of existence of an object. Thus, assistance of the driving operation can be enhanced.

According to the embodiment, a road surface other than the image of the vehicle and the object to be indicated in the history display region may be indicated in at least one of an average color of the road surface and an average brightness of the road surface obtained from the obtained image information. In this way, the road surface can be indicated in the color and the brightness, which are similar to the color and the brightness of an actual road surface, in the history display region. By indicating the road surface in at least one of the average color and the average brightness, noise can be reduced on the screen. Further, the road surface can be further distinctive from the object in the image. Thus, recognition of the driver can be further enhanced.

According to the embodiment, a detection unit for detecting a distance from a vehicle and detecting an on-road object around the periphery of the vehicle may be further provided. The detection unit may detect the position information about the on-road object.

According to the present structure, the position information on the on-road object can be complemented by the object detection unit. Thus, the position of the on-road object can be further accurately notified to a driver, and assistance of a driving operation can be further enhanced.

According to the embodiment, the graphic unit may indicate a scale line in the history display region for showing a predetermined distance from the vehicle. In the present structure, an on-road object and/or a road indication, and the scale line are drawn around the vehicle in the history display region. Therefore, a driver can recognize the position of the vehicle relative to a space around the vehicle periphery in detail. Thus, assistance of a driving operation can be further enhanced.

According to the embodiment, at least one of a position of an axle portion and a wheel of the vehicle may be indicated in the history display region. In this way, a driver can be clearly notified of the relative position of the axle portion and/or the wheel to the periphery of the vehicle by indicating at least one of the position of the axle portion and the wheel of the vehicle in the history display region. Thus, assistance of a driving operation can be further enhanced.

According to the embodiment, the present image of the periphery of the vehicle photographed by the imaging unit may be indicated in the peripheral image display region, without correction of distortion caused in the image. In this way, an indication range on the rear side of the vehicle can be enlarged, compared with an indication of an image, in which distortion is corrected. Thus, a driver can obtain enhanced vehicle peripheral information.

According to the embodiment, the imaging unit may photograph an image on the rear side of the vehicle, and the present image on the rear side of the vehicle photographed by the imaging unit may be indicated in the peripheral image display region, without correction of distortion caused in the image. In this way, an actual distorted image on the rear side of the vehicle is indicated in the peripheral image display region. Thereby, an indication range on the rear side of the vehicle can be enlarged, compared with an indication of an image, in which distortion is corrected. Thus, a driver can obtain further enhanced vehicle peripheral information. Distortion in the rear image is added to the history display region. Therefore, the present raw image in the peripheral image display region can be visually connected with the image in the history display region, which is presently out of the view area of the imaging unit, in the display screen. Thus, a driver can further easily recognize the position of the self-vehicle. Consequently, an image range on the rear side of the vehicle can be secured, and viewability of a driver can be enhanced.

According to the embodiment, the graphic unit adds distortion of the image indicated in the peripheral image display region to the image in the history display region. In this way, distortion of the image around the periphery of the vehicle is added to the on-road object and/or road indication obtained from the history data and indicated in the history display region. Therefore, the present raw image in the peripheral image display region can be visually connected with the image in the history display region, which is presently out of the view area of the imaging unit, in the display screen. Thus, a driver can further easily recognize a relationship between the vehicle and the periphery of the vehicle presently out of the view area.

The above processings such as calculations and determinations are not limited being executed by the microcomputer 1 and the graphic processing circuit 4. The control unit may have various structures including, for example, the microcomputer 1 and the graphic processing circuit 4 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicle periphery display device indicating an image of a periphery of a vehicle, the vehicle periphery display device comprising:
   an imaging unit configured to photograph an image of a periphery of the vehicle;
   a first object detection unit configured to
      obtain image information related to at least one of a brightness and a color of the photographed image from the photographed image,
      obtain position information on the photographed image from the photographed image,
      detect an object including at least one of a road indication and an on-road object from the obtained image information according to a specific feature of the object in the photographed image by comparing a level of the at least one of the brightness and the color of the photographed image with a predetermined threshold level, the object being detected when the level of the at least one of the brightness and the color of the photographed image exceed the predetermined threshold level, and
      associate the image information on the object with the position information on the object;
   a storing unit configured to
      beforehand store a vehicle image of the vehicle and store history data of the associated image information and the position information;
   a graphic unit configured to
      generate an image according to the history data,
      overlap the generated image and an image including the beforehand stored vehicle image, and
      convert the overlapped image to be viewed from a predetermined viewpoint,
   a display screen including
      a peripheral image display region configured to indicate the present image of the periphery of the vehicle obtained by the imaging unit and
      a history display region adjacent to the peripheral image display region and configured to indicate the converted image and the object detected from the image information in the converted image at a position according to the associated position information.

2. The vehicle periphery display device according to claim 1, wherein the first object detection unit obtains the image information from a single photographed image and detects the object using the obtained image information from the single photographed image.

3. A method for indicating an image of a periphery of a vehicle, the method comprising:
   photographing a present image of a periphery of the vehicle;
   obtaining image information related to at least one of a brightness and a color of the photographed image from the photographed image;
   obtaining position information on the photographed image from the photographed image;
   detecting a parking line, which specifies a parking space from the obtained image information related to at least one of the brightness and the color of the photographed image according to a specific feature of the object in the photographed image by comparing a level of the at least one of the brightness and the color of the photographed image with a predetermined threshold level, the object being detected when the level of the at least one of the brightness and the color of the photographed image exceed the predetermined threshold level;
   associating the obtained image information on the object with the obtained position information on the object;
   storing history data of the associated image information and the associated position information;
   generating an image according to the history data;
   overlapping the generated image and a beforehand stored vehicle image of the vehicle;
   converting the overlapped image to be viewed from a predetermined viewpoint;
   indicating the present image of the periphery of the vehicle in a peripheral image display region;
   indicating the converted image in a history display region adjacent to the peripheral image display region; and
   indicating the detected object in the converted image at a position according to the associated position information.

4. A non-transitory computer readable medium comprising instructions executed by a computer, the instructions including the method according to claim 3.

5. The method according to claim 3, wherein the first object detection unit obtains the image information from a single photographed image and detects the object using the obtained image information from the single photographed image.

6. A vehicle periphery display device indicating an image of a periphery of a vehicle, the vehicle periphery display device comprising:
   an imaging unit configured to photograph an image of a periphery of the vehicle;
   a first object detection unit configured to
      obtain image information related to at least one of a brightness and a color of the photographed image from the photographed image,
      obtain position information on the photographed image from the photographed image,
      detect a parking line, which specifies a parking space, from the obtained image information related to at least one of the brightness and the color of the photographed image according to a specific feature of the parking line in the photographed image by comparing a level of the at least one of the brightness and the color of the photographed image with a predetermined threshold level, the object being detected when the level of the at least one of the brightness and the color of the photographed image exceed the predetermined threshold level, and
      associate the image information on the parking line with the position information on the parking line;
   a storing unit configured to
      store a vehicle image of the vehicle and
      store history data of the associated image information and the position information;
   a graphic unit configured to
      generate an image according to the history data,
      overlap the generated image and an image including the stored vehicle image, and
      convert the overlapped image to be viewed from a predetermined viewpoint,
   a display screen including
      a peripheral image display region configured to indicate the present image of the periphery of the vehicle obtained by the imaging unit and
      a history display region adjacent to the peripheral image display region and configured to indicate the converted image and the parking line detected from the image information in the converted image by allocating a dot in a predetermined size at a position according to the associated position information.

7. The vehicle periphery display device according to claim 6, wherein the history display region is configured to indicate the parking line in at least one of the brightness and the color, which is related to the image information.

8. The vehicle periphery display device according to claim 6,
   wherein the first object detection unit is configured to detect a width of the parking line detected from the image information, and
   the history display region is configured to indicate the parking line to have a width, which corresponds to the detected width.

9. The vehicle periphery display device according to claim 6, wherein the history display region is configured to indicate a road surface, which is other than the vehicle image and the parking line, in at least one of an average color of the road surface and an average brightness of the road surface, which is obtained from the image information.

10. The vehicle periphery display device according to claim 6, further comprising:
   a second object detection unit configured to detect an on-road object around the periphery of the vehicle and detect a distance of the detected on-road object from the vehicle,
   wherein the second object detection unit is configured to detect position information on the on-road object.

11. The vehicle periphery display device according to claim 6, wherein the graphic unit is configured to cause the history display region to indicate a scale line for specifying a predetermined distance from the vehicle.

12. The vehicle periphery display device according to claim 6, wherein the history display region is configured to indicate at least one of a position of an axle portion of the vehicle and a wheel of the vehicle.

13. The vehicle periphery display device according to claim 6, wherein the peripheral image display region is configured to indicate the present image of the periphery of the vehicle, which is obtained by the imaging unit, without correction of distortion caused in the present image.

14. The vehicle periphery display device according to claim 13, wherein the graphic unit is configured to add distortion of the present image, which is in the peripheral image display region, to the image in the history display region.

15. The vehicle periphery display device according to claim 6,
   wherein the imaging unit is configured to obtain a present rear image on a rear side of the vehicle, and
   the peripheral image display region is configured to indicate the present rear image obtained by the imaging unit, without correction of distortion caused in the present rear image.

16. The vehicle periphery display device according to claim 15, wherein the graphic unit is configured to add distortion of the present rear image, which is in the peripheral image display region, to the image in the history display region.

17. The vehicle periphery display device according to claim 6,
   wherein the first object detection unit is configured to further detect, as the position information, coordinates of a center portion of a width of the parking line, and
   the history display region is further configured to allocate the dot at a position according to the position information corresponding to the coordinates of the center portion.

18. The vehicle periphery display device according to claim 17,
   wherein the first object detection unit is configured to further
      detect a difference between the image information, which is detected as the parking line, and a threshold and
      calculate a brightness according to the detected difference, and
   the history display region is further configured to indicate the parking line in the calculated brightness.

19. The vehicle periphery display device according to claim 6, wherein the first object detection unit obtains the image information from a single photographed image and detects the object using the obtained image information from the single photographed image.

* * * * *